(12) United States Patent
Kalantari et al.

(10) Patent No.: US 12,074,671 B2
(45) Date of Patent: Aug. 27, 2024

(54) POLARIZATION ALIGNED TRANSMISSION TOWARDS A RECEIVER DEVICE

(71) Applicant: Telefonaktiebolaget LM Ericsson (publ), Stockholm (SE)

(72) Inventors: Ashkan Kalantari, Malmö (SE); Shousheng He, Södra Sandby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 244 days.

(21) Appl. No.: 17/765,965

(22) PCT Filed: Oct. 4, 2019

(86) PCT No.: PCT/EP2019/076973
§ 371 (c)(1),
(2) Date: Apr. 1, 2022

(87) PCT Pub. No.: WO2021/063523
PCT Pub. Date: Apr. 8, 2021

(65) Prior Publication Data
US 2022/0352942 A1    Nov. 3, 2022

(51) Int. Cl.
*H04B 7/06* (2006.01)
*B64C 39/02* (2023.01)
(Continued)

(52) U.S. Cl.
CPC ......... *H04B 7/0617* (2013.01); *B64C 39/024* (2013.01); *G06T 7/70* (2017.01);
(Continued)

(58) Field of Classification Search
CPC ........ H04W 64/00; H04W 16/28; H04B 7/10; H04B 7/0617; H01Q 21/245; H01Q 3/30; B64C 39/024; G06T 7/70
See application file for complete search history.

(56) References Cited

U.S. PATENT DOCUMENTS

| | | |
|---|---|---|
| 2013/0346871 A1 | 12/2013 | Ono |
| 2014/0266900 A1 | 9/2014 | Kasher |
| (Continued) | | |

FOREIGN PATENT DOCUMENTS

| | | |
|---|---|---|
| CN | 109360240 A | 2/2019 |
| KR | 10-1866920 B1 | 7/2018 |

OTHER PUBLICATIONS

International Search Report and Written Opinion issued in International Application No. PCT/EP2019/076973, dated May 26, 2020 (16 pages).

(Continued)

*Primary Examiner* — Khanh C Tran
(74) *Attorney, Agent, or Firm* — Weisberg I.P. Law, P.A.

(57) ABSTRACT

There is provided mechanisms for polarization aligned transmission towards a receiver device. A method is performed by a mobile wireless device. The mobile wireless device comprises an antenna array. The method comprises obtaining, based on analysis of an image of the receiver device as captured by an image capturing unit, information of orientation of the receiver device. The orientation pertains to orientation of an antenna of the receiver device towards which a signal is to be transmitted. The method comprises transmitting the signal from the antenna array towards the receiver device using a wave. The wave has its polarization aligned, based on the orientation of the receiver device, with the antenna of the receiver device.

18 Claims, 7 Drawing Sheets

(51) Int. Cl.
  *G06T 7/70* (2017.01)
  *H01Q 21/24* (2006.01)
  *H04W 64/00* (2009.01)
  *B64U 101/20* (2023.01)

(52) U.S. Cl.
  CPC .......... *H01Q 21/245* (2013.01); *H04W 64/00* (2013.01); *B64U 2101/20* (2023.01); *G06T 2207/10032* (2013.01)

(56) References Cited

U.S. PATENT DOCUMENTS

| | | | |
|---|---|---|---|
| 2015/0304094 A1* | 10/2015 | Bowers | H01Q 9/0407 375/308 |
| 2017/0029107 A1* | 2/2017 | Emami | G08G 5/0069 |
| 2017/0374342 A1 | 12/2017 | Zhao | |
| 2018/0067204 A1 | 3/2018 | Frizzell | |
| 2018/0284217 A1 | 10/2018 | Takeuchi | |
| 2018/0324600 A1* | 11/2018 | Aldana | H04B 7/0617 |
| 2019/0042227 A1 | 2/2019 | Sharma | |
| 2019/0097328 A1 | 3/2019 | Yong et al. | |
| 2019/0173324 A1 | 6/2019 | Amitz et al. | |
| 2020/0021128 A1* | 1/2020 | Bell | H02J 50/80 |
| 2022/0103022 A1* | 3/2022 | Bell | G06V 30/224 |

OTHER PUBLICATIONS

Leng, J., "Using a UAV to Effectively Prolong Wireless Sensor Network Lifetime With Wireless Power Transfer", The Graduate College at the University of Nebraska, Lincoln, Nebraska, May 2014 (82 pages).

Wang, C. et al., "Location Assistant Beamforming for High Speed Railway", IEEE, 2012 (pp. 1108-1112).

Davison, A. et al., "MonoSLAM: Real-Time Single Camera SLAM", IEEE Transactions on Pattern Analysis and Machine Intelligence, vol. 29, No. 6, Jun. 2007 (pp. 1052-1067).

Rahman, A., "An Image Based Approach to Compute Object Distance", International Journal of Computational Intelligence Systems, vol. 1, No. 4, Mar. 2012 (pp. 304-312).

Foster, N. J. et al., "Determining Object Orientation from a Single Image Using Multiple Information Sources", Department of Electrical and Computer Engineering and The Robotics Institute, Carnegie-Mellon University, Pittsburgh, Pennsylvania, Jun. 1984 (109 pages).

Zorbas, D. et al., "Computing Optimal Drone Positions to Wirelessly Recharge IoT Devices", IEEE, Wireless Sensor, Robot and UAV Networks, 2018 (pp. 628-633).

* cited by examiner

POLARIZATION ALIGNED TRANSMISSION TOWARDS A RECEIVER DEVICE

CROSS REFERENCE TO RELATED APPLICATION(S)

This application is a 35 U.S.C. § 371 National Stage of International Patent Application No. PCT/EP2019/076973, filed Oct. 4, 2019.

TECHNICAL FIELD

Embodiments presented herein relate to a method, a mobile wireless device, a computer program, and a computer program product for polarization aligned transmission towards a receiver device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability for a transmitter device to efficiently steer its emitted energy towards one or more receiver devices. In general terms, the antenna array of a transmitter device can be used to efficiently steer the emitted energy, for example represented by a beam, towards one or more receiver devices. Such steering of energy typically requires knowledge of the radio propagation channel between the transmitter device and the receiver device, for example in terms of channel state information at the transmitter (CSIT) and/or the location of the receiver device. Battery-less devices, e.g., sensors, might not have the energy, or power, for initial pilot transmission or signal processing to enable channel estimation at the transmitter device. As an alternative, the relative (or absolute) positions of the transmitter device and the receiver device might be used to correctly steer the energy towards the receiver device, see C. Wang, R. Xu, J. You and Z. Zhong, "Location assistant beamforming for high speed railway," in *International Wireless Communications and Mobile Computing Conference (IWCMC)*, Limassol, 2012. When the transmitter device is mobile, for example provided as a mobile wireless device, the transmitter device is then required to estimate and/or track its position using either positioning information provided by a satellite positioning system or from a wireless network to correctly steer the energy toward the receiver device. However, due to the uneven nature of the earth surface, the altitude provided by a satellite positioning system might not be accurate enough for beam steering and depending on the distance from the transmitter device to the receiver device, it can lead into significant error in beam steering. In addition, positioning using information from a wireless network might require high synchronization accuracy and such a wireless network may not be always available.

Based on the aforementioned issues, it might be difficult to correctly steer the energy toward the receiver device, especially when the transmitter device is mobile and channel state information is not available. It has in US 2014/0266900 A1 been suggested to use one image, or a sequence of images, captured by a mobile wireless device to detect the orientation change of the mobile wireless device and based on this orientation change update its beamforming, which is already set up for a wireless radio frequency link. The update is carried out by changing the position and orientation (directionality) of the antennas of the transmitter device or by means of beamforming training based on the detected orientation change of the mobile wireless device. However, it might still be difficult to correctly steer the beam towards the receiver device.

Hence, there is still a need for improved steering of energy from a transmitter device, such as a mobile wireless device, towards a receiver device.

SUMMARY

An object of embodiments herein is to overcome the aforementioned issues, and in particular to overcome these issues in terms of aligned polarization between the transmitter device and the receiver device.

According to a first aspect there is presented a method for polarization aligned transmission towards a receiver device. The method is performed by a mobile wireless device. The mobile wireless device comprises an antenna array. The method comprises obtaining, based on analysis of an image of the receiver device as captured by an image capturing unit, information of orientation of the receiver device. The orientation pertains to orientation of an antenna of the receiver device towards which a signal is to be transmitted. The method comprises transmitting the signal from the antenna array towards the receiver device using a wave. The wave has its polarization aligned, based on the orientation of the receiver device, with the antenna of the receiver device.

According to a second aspect there is presented a mobile wireless device for polarization aligned transmission towards a receiver device. The mobile wireless device comprises an antenna array. The mobile wireless device further comprises processing circuitry. The processing circuitry is configured to cause the mobile wireless device to obtain, based on analysis of an image of the receiver device as captured by an image capturing unit, information of orientation of the receiver device. The orientation pertains to orientation of an antenna of the receiver device towards which a signal is to be transmitted. The processing circuitry is configured to cause the mobile wireless device to transmit the signal from the antenna array towards the receiver device using a wave. The wave has its polarization aligned, based on the orientation of the receiver device, with the antenna of the receiver device.

According to a third aspect there is presented a mobile wireless device for polarization aligned transmission towards a receiver device. The mobile wireless device comprises an antenna array. The mobile wireless device further comprises an obtain module configured to obtain, based on analysis of an image of the receiver device as captured by an image capturing unit, information of orientation of the receiver device. The orientation pertains to orientation of an antenna of the receiver device towards which a signal is to be transmitted. The mobile wireless device further comprises a transmit module configured to transmit the signal from the antenna array towards the receiver device using a wave. The wave has its polarization aligned, based on the orientation of the receiver device, with the antenna of the receiver device.

According to a fourth aspect there is presented a computer program for polarization aligned transmission towards a receiver device, the computer program comprising computer program code which, when run on a mobile wireless device comprising an antenna array, causes the mobile wireless device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, this method, these mobile wireless devices, this computer program, and this computer program product provide efficient steering of energy from the mobile wireless device towards the receiver device.

Advantageously, this method, these mobile wireless devices, this computer program, and this computer program product enable efficient energizing of the receiver device without knowledge, such as channel state information, of the radio propagation channel between the mobile wireless device and the receiver device (since the receiver device might be assumed not to be able to communicate before receiving the signal from the wireless mobile device).

Advantageously, this method, these mobile wireless devices, this computer program, and this computer program product do not rely on the positioning information provided by a satellite positioning system or from a wireless network for the polarization alignment.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
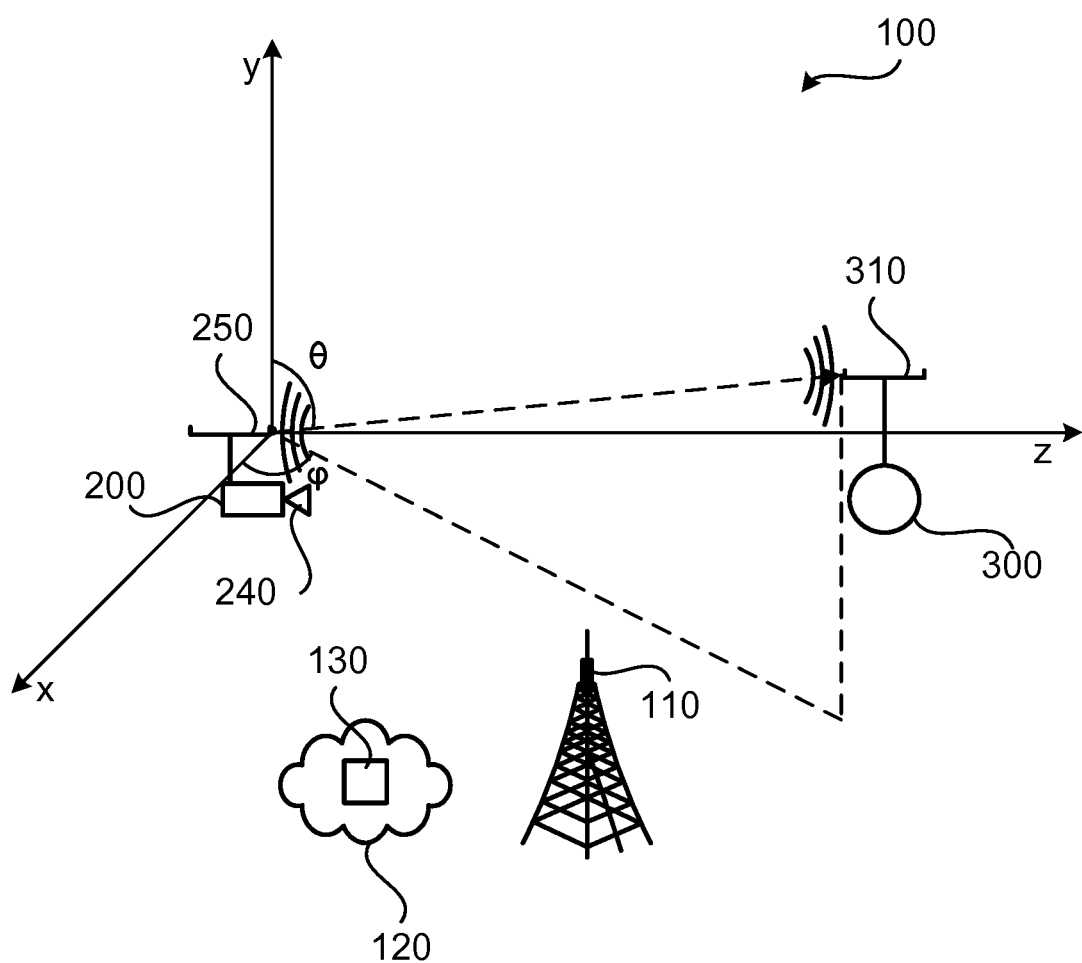
FIG. 1 is a schematic diagram illustrating a communication system according to embodiments.

FIG. 1 is a schematic diagram illustrating a communication system 100 where embodiments presented herein can be applied. The communication system 100 comprises a mobile wireless device 200. In some embodiments the mobile wireless device 200 is an unmanned aerial vehicle. In further examples, the mobile wireless device 200 might be any of mobile station, mobile phone, handset, wireless local loop phone, user equipment (UE), smartphone, laptop computer, tablet computer, etc. configured to perform the methods disclosed herein. The mobile wireless device 200 is equipped with an antenna array 250. In some examples the antenna array 250 comprises dual polarized antenna elements 260 (see, FIGS. 3 and 5 as referred to below). The communication system 100 further comprises an image capturing unit 240. There could be different examples of image capturing units 240, such as video cameras, infrared cameras, and the like. In some examples, the image capturing unit 240 is integrated with, collocated with, or part of, the mobile wireless device 200. In other examples, the image capturing unit 240 is physically separated from the mobile wireless device 200. The communication system 100 further comprises a receiver device 300. The receiver device 300 is equipped with an antenna 310. In some embodiments the receiver device 300 is a wireless sensor device, or a near-field communication (NFC) device, such as a battery-less sensor device or a low-power sensor device, or even an ultra low-power sensor device, having a power consumption of at most 2 mW, or even at most 1 mW, or even at most 0.5 mW, or even at most 0.1 mW, or even at most 0.05 mW, or even at most 0.01 mW, or even at most 0.005 mW, or even at most 0.001 mW.

Without loss of generality, as illustrated in FIG. 1, the mobile wireless device 200 and the receiver device 300 are oriented with respect to each other in a three-dimensional coordinate represented by an x-axis, a y-axis, and a z-axis.

The communication system 100 further comprises a computational entity 130 that resides in a cloud computational environment 120. Further aspects of the computational entity 130 will be provided below.

The communication system 100 further comprises a network node 110 configured for communication with the mobile wireless device 200. The network node 110 might be any of a radio access network node, radio base station, base transceiver station, node B (NB), evolved node B (eNB), gNB, or access point. In general terms, the network node 110 facilitates communication between the mobile wireless device 200 and a network, such as a cellular mobile communication network, of which the network node 110 itself might be part. The network node 110 might also facilitate communication between the mobile wireless device 200 and the computational entity 130.

In general terms, the receiver device 300 is configured to receive signals from the mobile wireless device 200. For example, the mobile wireless device 200 might be configured to wirelessly provide the receiver device 300 with energy. Since it in at least some scenarios is assumed that the receiver device 300 does not have enough energy to communicate with the mobile wireless device 200 (before energy has been provided to the receiver device 300 from the mobile wireless device 200), it is not possible for the mobile wireless device 200 to estimate the radio propagation channel from the antenna array 250 of the mobile wireless device 200 to the antenna 310 of the receiver device 300. Hence, a beam, for example a pencil beam, used for transmission of a radio signal from the mobile wireless device 200 towards the receiver device 300 is to be steered towards the antenna 310 of the receiver device 300 without knowledge of channel state information. The relative location of the receiver device 300 with respect to the mobile wireless device 200 might be used to steer the beam towards the receiver 300. However, position information of the receiver device 300 as acquired from a satellite positioning system or from a wireless network (such as triangulation) might not be sufficiently accurate, might not be always available, and/or might not be up to date.

According to at least some of the herein disclosed embodiments, an image of the receiver device 300 as captured by the image capturing unit 240 is used to determine the relative position of the receiver device 300, or its antenna 310 (the position and orientation of the antenna 310 with respect to the receiver device 300 are assumed to be known), with respect to the mobile wireless device 200, or its antenna array 250 (the position and orientation of the antenna array 250 with respect to the mobile wireless device 200 are assumed to be known). This information can be used to steer transmission from the mobile wireless device 200 towards the receiver device 300 in an efficient manner, for example in terms of polarization alignment.

The embodiments disclosed herein in particular relate to mechanisms for polarization aligned transmission towards a receiver device 300. In order to obtain such mechanisms there is provided a mobile wireless device 200, a method performed by the mobile wireless device 200, a computer program product comprising code, for example in the form of a computer program, that when run on a mobile wireless device 200, causes the mobile wireless device 200 to perform the method.

Figure 2:
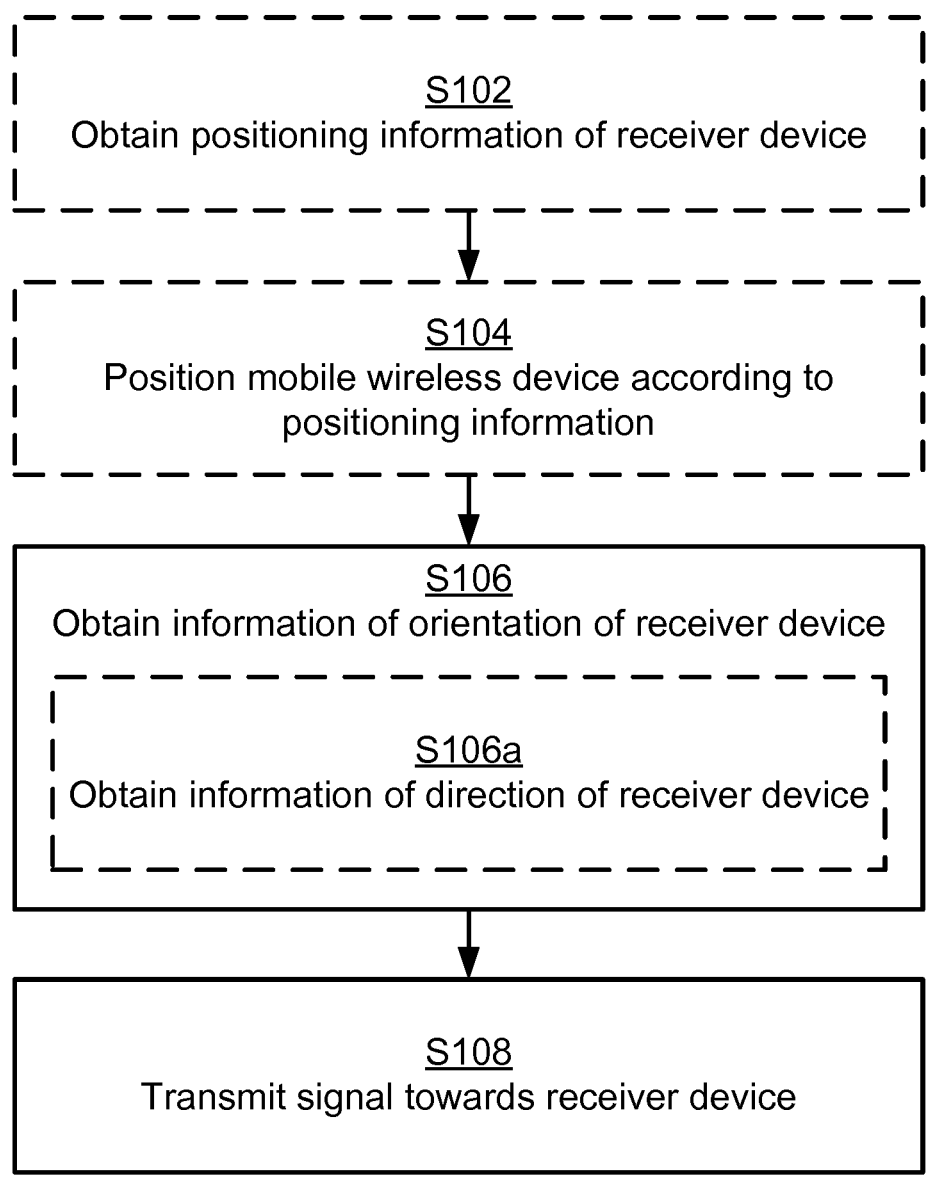
FIGS. 2 and 4 are flowcharts of methods according to embodiments.

FIG. 2 is a flowchart illustrating embodiments of methods for polarization aligned transmission towards a receiver device 300. The methods are performed by the mobile wireless device 200. As noted above, the mobile wireless device 200 comprises an antenna array 250. The methods are advantageously provided as computer programs 820.

Information extracted from an image of the receiver device 300 as captured by an image capturing unit 240 is used to determine relative orientation of the receiver device 300 with regards to the mobile wireless device 200. In particular, the mobile wireless device 200 is configured to perform step S106:

S106: The mobile wireless device 200 obtains, based on analysis of an image of the receiver device 300 as captured by an image capturing unit 240, information of orientation of the receiver device 300. The orientation pertains to orientation of the antenna 310 of the receiver device 300 towards which a signal is to be transmitted from the mobile wireless device 200 and towards the receiver device 300.

The information of the orientation is then used when transmitting the signal towards the receiver device. In particular, the mobile wireless device 200 is configured to perform step S108:

S108: The mobile wireless device 200 transmits the signal from the antenna array 250 towards the receiver device 300 using a wave. The wave has its polarization aligned, based on the orientation of the receiver device 300, with the antenna 310 of the receiver device 300.

The wave is a radio frequency wave and hence the signal might be regarded as a radio signal.

Embodiments relating to further details of polarization aligned transmission towards a receiver device 300 as performed by the mobile wireless device 200 will now be disclosed.

In some aspects, positioning information of the receiver device 300 is used to position the mobile wireless device 200. In particular, according to an embodiment, the mobile wireless device 200 is configured to perform (optional) steps S102 and S104:

S102: The mobile wireless device 200 obtains positioning information of the receiver device 300.

S104: The mobile wireless device 200 positions itself according to the positioning information such that the receiver device 300 is in view of the image capturing unit 240 for the image of the receiver device 300 to be captured by the image capturing unit 240.

It should here be noted that the positioning information represents auxiliary information and as such is not essential for aligning the polarization of the wave with the antenna 310 of the receiver device. Further, step S104 is also optional in the sense that the image capturing unit 240 not necessarily is part of the mobile wireless device 200.

In some aspects, the mobile wireless device 200 obtains directional information of the receiver device 300. In particular, according to an embodiment, the mobile wireless device 200 is configured to perform (optional) step S106a as part of S106:

S106a: The mobile wireless device 200 obtains, based on analysis of the image of the receiver device 300, information of direction from the mobile wireless device 200 towards the receiver device 300.

With the assistance of side information, such as positioning, imaging, mapping or certain other perceptive information, a geometry-based approach might thus be used for initial beam forming from the mobile wireless device 200 towards the sensor device 300, without knowledge of the radio propagation channel.

Simultaneous localization and mapping (SLAM) can be used to localize the mobile wireless device 200 in an environment. The acquired coordinates can be used to steer the beam towards the antenna 310 of the receiver device 300 and align the polarization of the wave used to transmit the signal with that of the antenna 310.

Figure 3:
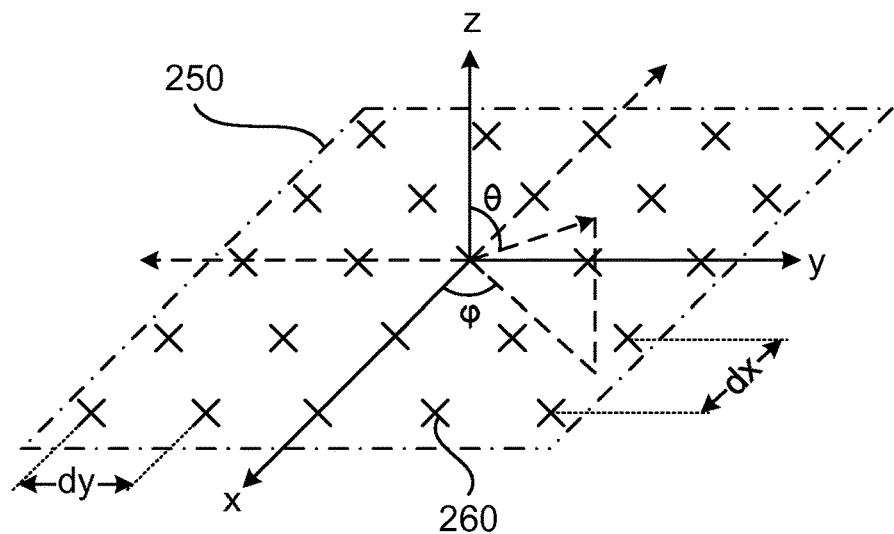
FIGS. 3 and 5 schematically illustrate antenna arrays in the coordinate system of FIG. 1 according to embodiments.

Aspects of the polarization alignment will now be disclosed. In some embodiments, the wave has its polarization aligned with the antenna 310 of the receiver device 300 by a relative magnitude of co-polarized and cross-polarized antenna element weights of the antenna array 250 being adjusted to satisfy an angular relation. Further aspects relating thereto will be disclosed below with reference to FIG. 4. In some embodiments, the wave has its polarization aligned with the antenna 310 of the receiver device 300 by antenna elements 260 of the antenna array 250 being aligned with respect to polarization with the antenna 310 of the receiver device 300. As will be further disclosed below, the alignment might be electrically achieved by determining amplitude and/or phase for weights that are applied to antenna elements of the antenna array. However, the alignment might also be mechanically achieved by tilting the antenna array 250. Reference is here made to FIG. 3 which illustrates the antenna array 250 comprising antenna elements 260 located in a grid in the xy-plane (using the same orientation of the coordinate system as in FIG. 1). In the example of FIG. 3, all adjacent antenna elements 260 are along the x-axis separated a distance dx and along the y-axis separated a distance dy.

There might be different ways to transmit the signal using the wave. In some embodiments, the signal is transmitted in a beamformed pencil beam. In order to do so, beamforming weights are applied to antenna elements 260 of the antenna array 250. The beamforming weights are determined by orientation and direction of the antenna array 250 relative the orientation and direction of the antenna 310 of the receiver device 300 and relative distance between the mobile wireless device 200 and the receiver device 300.

In some aspects, the relative distance between the mobile wireless device 200 and the receiver device 300 is estimated using image processing. In particular, in some embodiments, the relative distance is estimated based on analysis of the image, focal view of the image capturing unit 240, and number of pixels of the image. The focal view of the image capturing unit 240 is assumed to be known.

Alternatively, bearing angle and distance of the image capturing unit 240 with respect to the receiver device 300 might be separately estimated. To do so, the antenna 310 might be visually marked using a specific sign and color, e.g., the middle point of a cross and where the size of the marking is known. Further details relating thereto will be disclosed below with reference to FIGS. 4 and 5.

There might be different entities in which the image processing is performed. In some embodiments, the the analysis of the image is performed by the mobile wireless device 200 itself In other embodiments, the analysis of the image is performed by the computational entity 130. As in the illustrative example of FIG. 1, the computational entity 130 is physically separated from the mobile wireless device 200. The information of orientation of the receiver device 300 is then obtained by the mobile wireless device 200 by being received from the computational entity 130.

As noted above, the mobile wireless device 200 might be configured to wirelessly provide the receiver device 300 with energy. In particular, according to an embodiment, the signal as transmitted in S108 provides the receiver device 300 with energy. The mobile wireless device 200 might thereby find and communicate with receiver devices 300 that do not have enough energy, or power, or enable such receiver devices 300 to communicate with other entities, such as with the network node 110.

In some embodiments, the wave has a carrier frequency in the range 5 to 6 GHz. For example, the wave might have a carrier frequency of 5.8 GHz.

Figure 4:
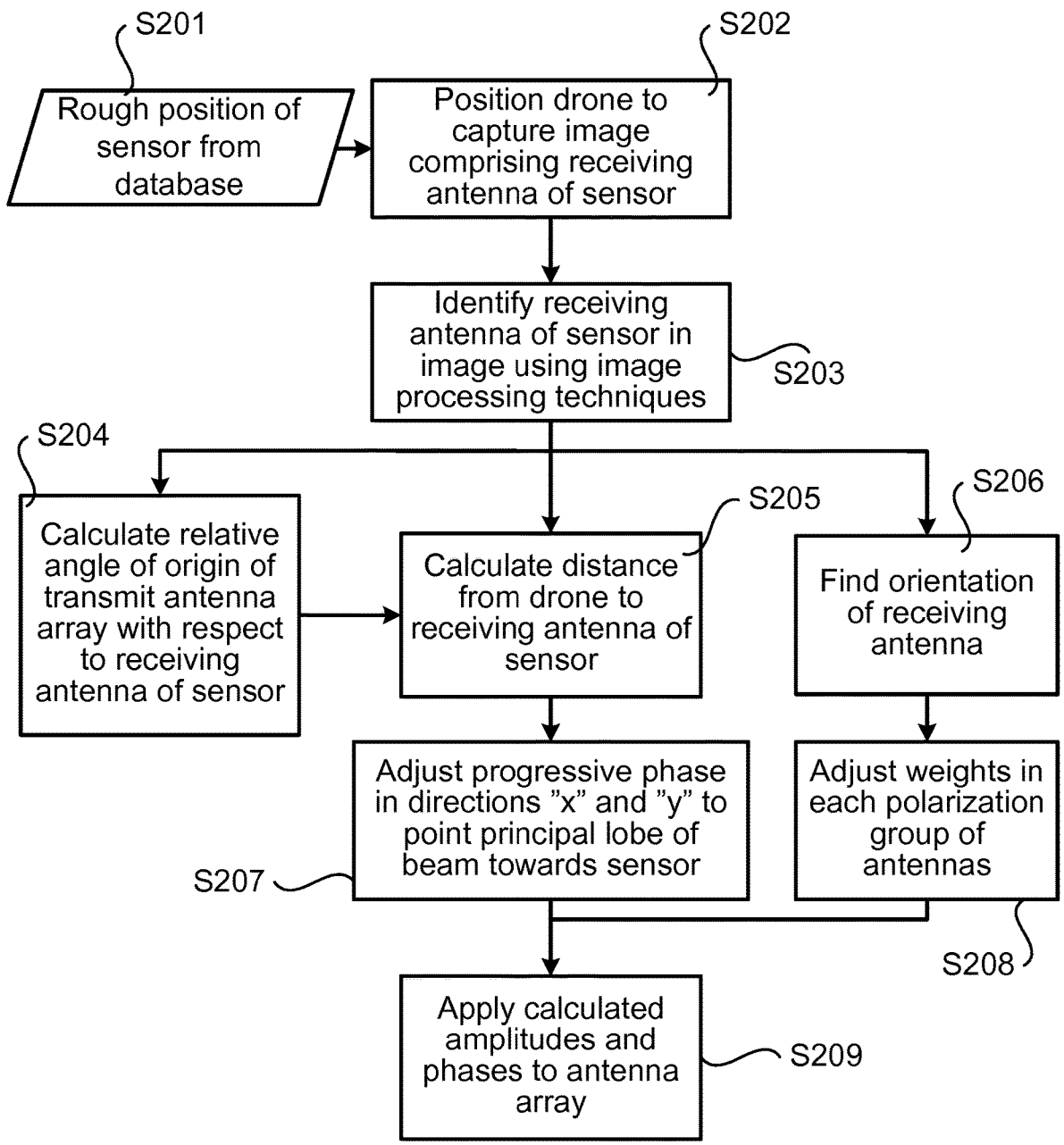

One particular embodiment for polarization aligned transmission towards the receiver device 300 as performed by the mobile wireless device 200 based on at least some of the above embodiments will now be disclosed with reference to the flowchart of FIG. 4. In this embodiment it is assumed that the image capturing unit 240 is integrated with, collocated with, or part of, the mobile wireless device 200.

The mobile wireless device 200 uses the position of the receiver device 300 (S201) to position itself (S202) such that the receiver device 300 is in the view of the image capturing unit 240. Then, an image is taken of the receiver device 300 and image processing is used to in the thus captured image identify the antenna 310 of the receiver device 300 (S203).

The number of pixels of the image sensor of the image capturing unit 240 and the focal view of the image capturing unit 240 is used (S204) to determine how many degrees $\theta_{pixel}$ does each pixel in the image represents. The value of $\theta_{pixel}$ can be determined according to:

$$\theta_{pixel} = \frac{\text{angle of view}}{\sqrt{x_{pixels}^2 + y_{pixels}^2}}. \quad (1)$$

To calculate the angle of view of the receiver device 300 with respect to the image capturing unit 240, the number of pixels from the center of the image are counted and multiplied by $\theta_{pixel}$, which is given in equation (1). The accuracy of this expression depends on the focal view of the image capturing unit 240 and the lens distortion.

The orientation of the antenna 310 of the receiver device 300 is identified (S206) using the captured image and the mobile wireless device 200 orients itself with respect to the receiver device 300 such that the plane cutting the antenna array 250 is parallel to the plane cutting the antenna 310, or likewise, that the plane of the antenna array 250 is parallel to the plane of the antenna 310. In this respect the antenna 310 might be considered as being placed in a plane that is perpendicular to a line in space linking the antenna array 250 and the antenna 310. The orientation of the antenna 310 (within its plane) can be arbitrary. That is, the plane that the antenna 310 is placed in is parallel to the plane in which the antenna array 250 is placed. The mobile wireless device 200 determine the distance to the receiver device (S205), for example as disclosed in D. A. Rahman, A. Salam, M. Islam and P. Sarker, "An Image Based Approach to Compute Object Distance," *International Journal of Computational Intelligence Systems*, vol. 1, no. 4, pp. 304-312, 2008.

Now that the relative angle, the azimuth φ and elevation θ, of the antenna array 250 of the mobile wireless device 200 with respect to the antenna 310 of the receiver device 30 is determined, it is possible to steer the beam carrying the signal towards the receiver device 300 and align the polarization of the wave with that of the antenna 310 of the receiver device 300 (S207). To do so, the progressive phases denoted by $\beta_x$ and $\beta_y$, along directions x and y (as in the coordinate system of FIG. 1), respectively, are adjusted such that:

$$kd_x \sin\theta \cos\varphi + \beta_x = 0, \; kd_y \sin\theta \cos\varphi + \beta_y = 0, \quad (2)$$

where $k=2\pi/\lambda$. In this way, the principal, and thus maximum energy, beam of the antenna array 250 can be steered in direction φ and θ. Further, to maximize the energy to be received by the receiver device 300, the polarization of the wave is aligned with the polarization of the antenna 310 of the receiver device 300. In the far-field, the electric field of a diploe antenna in the direction of the z-axis (according to the orientation of FIG. 1) is given as:

$$E = j\eta k I_0 \frac{le^{-jkr}}{4\pi r} \sin\theta \hat{a}_\theta = E_0 \hat{a}_\theta, \quad (3)$$

where l is the length of the dipole. Considering that the antenna array 250 might comprise multiple dipoles, each represented by an antenna element 260, the electric field of a co-polarization and cross-polarization planar antenna array 250 can be written as:

$$E_{co} = E_0 AF(\varphi, \theta)\hat{a}_\theta, \; E_{cross} = -E_0 AF(\varphi, \theta)\hat{a}_\varphi, \; E_t = E_0 AF(\varphi, \theta)\hat{a}_\theta - E_0 AF(\varphi, \theta)\hat{a}_\varphi. \quad (4)$$

Figure 5:
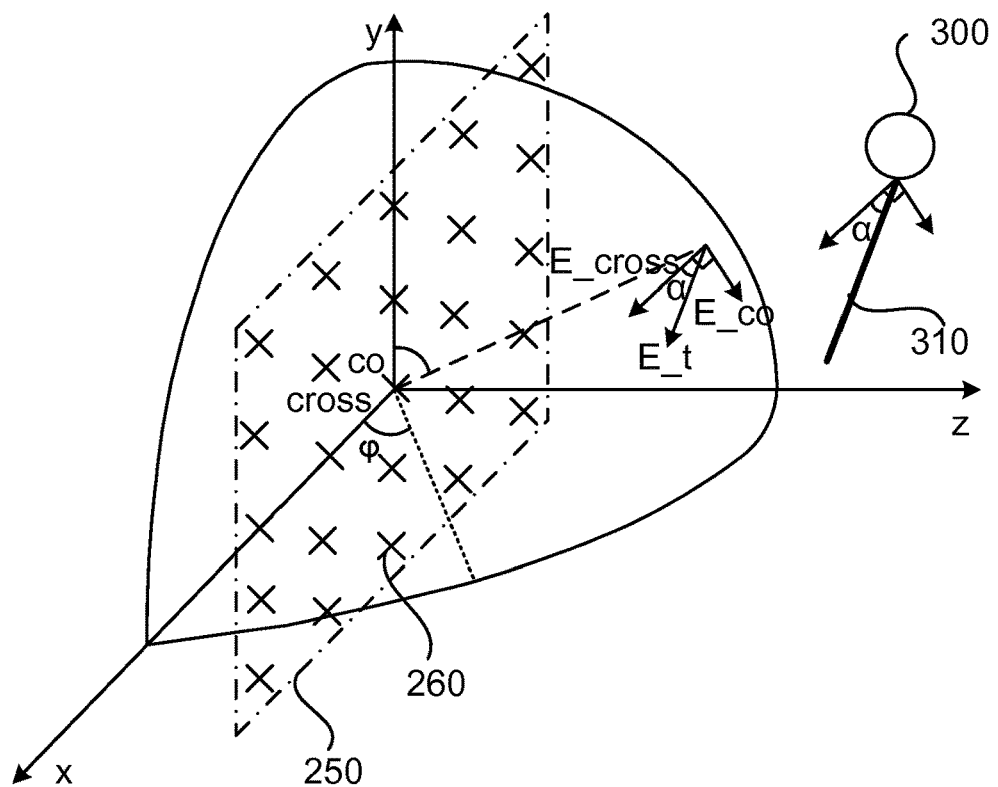

In equation (4), the parameter AF(φ, θ) is the array factor and is defined according to:

$$AF(\varphi, \theta) = \frac{I_0}{N_x N_y} \frac{\sin\left(\frac{N_x}{2}\lambda_x\right)\sin\left(\frac{N_y}{2}\lambda_y\right)}{\sin\left(\frac{\lambda_x}{2}\right)\sin\left(\frac{\lambda_y}{2}\right)}, \quad (5)$$

where $N_x$ and $N_y$ is the number of antenna elements 260 in directions x and y (as in the coordinate system of FIG. 1), respectively, $\lambda_x = k d_x \sin\theta \cos\varphi + \beta_x$, and $\lambda_y = k d_y \sin\theta \cos\varphi + \beta_y$. The electric fields $E_{co}$, $E_{cross}$ and $E_t$ are shown in FIG. 5 (using the same orientation of the coordinate system as in FIG. 1).

The amplitude of each polarization group of the antenna array 250 is adjusted (S208) such that the polarization of the wave matches that of the antenna 310 of the receiver device 300. The polarization might be linear in the angle a which matches the orientation of the antenna 310 of the receiver device 300, as illustrated in FIG. 5. The value of the angle α might found based on the identified orientation of the antenna 310 of the receiver device 300.

The following relation should hold between the magnitude of the co-polarization and cross-polarization antenna elements 260 of the antenna array 250:

$$\alpha = \pm \tan^{-1}\left(\frac{E_{co}}{E_{cross}}\right), \quad (6)$$

where $E_{co}$ and $E_{cross}$ are shown in FIG. 5. Based on the required value of α, it is possible to find the values of $E_{co}$ and $E_{cross}$ from equation (6). Then, the relations in equation (4) can be used to find the amount of energy to be fed into each polarization group of the antenna elements 260.

Finally, the derived values of the progressive phases in each direction and also the amplitude of the energy are applied (S209) to the antenna array 250 to both steer the beam in the direction of the antenna 310 of the receiver device 300 and also align the polarization of the wave with that of the antenna 310 of the receiver device 300.

In summary, according to at least some of the herein disclosed embodiments there has been proposed using image analysis to steer the beam of a mobile wireless device 200 towards a receiver device 300, and align the polarization of the transmitted wave with that of the antenna 310 of the receiver device 300 without the need of radio propagation channel information. The mobile wireless device 200 obtains an image from an image capturing unit 240 and can from the image identify the position and orientation of the antenna 310 of the receiver device 300. Then, based on the determined location and orientation of the antenna 310 of the receiver device 300 relative to the antenna array 250 of the mobile wireless device 200, the mobile wireless device 200 is enabled to steer a transmission beam toward the antenna 310 of the receiver device 300 and align the polarization of the wave that is transmitted in the beam with that of the antenna 310 of the receiver device 300. The phase of each antenna element 260 of the antenna array 250 might be adjusted so that the signal power as received by the receiver device 300 is maximized whilst having the same phase and results in a linearly polarized wave. Based on the orientation of the antenna 310 of the receiver device 300, the amplitude of antenna elements 260 of the antenna array 250 in each polarization group might be adjusted so that the polarization of the signal as transmitted by the antenna array 250 is the same as that of the antenna 310 of the receiver device 300.

Further, although the embodiments have been described as transmitting a signal from the mobile wireless device 200 towards one receiver device 300, it is to be understood that the embodiments disclosed herein can be readily modified such that one and the same mobile wireless device 200 simultaneously might transmit the signal towards at least two receiver devices 300 simultaneously, by proper beam forming, and assuming that the antennas 310 of all receiver devices 300 have same orientation.

Figure 6:
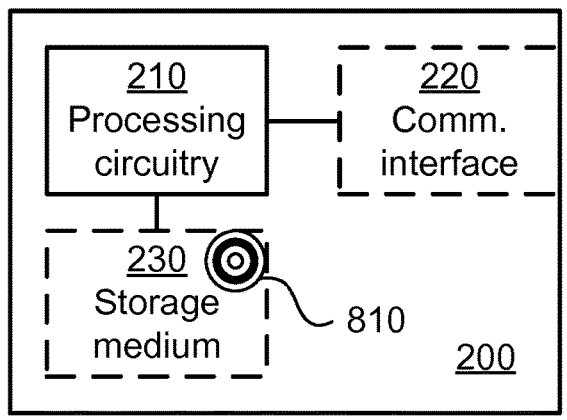
FIG. 6 is a schematic diagram showing functional units of a mobile wireless device according to an embodiment.

FIG. 6 schematically illustrates, in terms of a number of functional units, the components of a mobile wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the mobile wireless device 200 to perform a set of operations, or steps, as disclosed above. For example, the storage medium 230 may store the set of operations, and the processing circuitry 210 may be configured to retrieve the set of operations from the storage medium 230 to cause the mobile wireless device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The mobile wireless device 200 may further comprise a communications interface 220 at least configured for communications with other entities, functions nodes and devices of the communication system 100. As such the communications interface 220 may comprise one or more transmitters and receivers, comprising analogue and digital components. The communications interface 220 might comprise the antenna array 250 and its antenna elements 260 and a beamforming network configured to steer beams from the antenna array 250 towards an intended receiver according to beamforming weights.

The processing circuitry 210 controls the general operation of the mobile wireless device 200 e.g. by sending data and control signals to the communications interface 220 and the storage medium 230, by receiving data and reports from the communications interface 220, and by retrieving data and instructions from the storage medium 230. Other components, as well as the related functionality, of the mobile wireless device 200 are omitted in order not to obscure the concepts presented herein.

Figure 7:
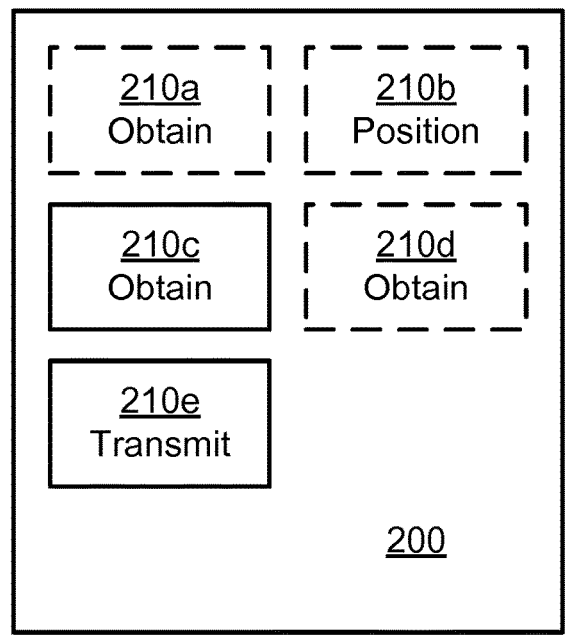
FIG. 7 is a schematic diagram showing functional modules of a mobile wireless device according to an embodiment.

FIG. 7 schematically illustrates, in terms of a number of functional modules, the components of a mobile wireless device 200 according to an embodiment. The mobile wireless device 200 of FIG. 7 comprises a number of functional modules; an obtain module 210c configured to perform step S106, and a transmit module 210e configured to perform step S108. The mobile wireless device 200 of FIG. 7 may further comprise a number of optional functional modules, such as any of an obtain module 210a configured to perform step S102, a position module 210b configured to perform step S104, and an obtain module 210d configured to perform step S106a. In general terms, each functional module 210a-210e may in one embodiment be implemented only in hardware and in another embodiment with the help of software, i.e., the latter embodiment having computer program instructions stored on the storage medium 230 which when run on the processing circuitry makes the mobile wireless device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Figure 8:
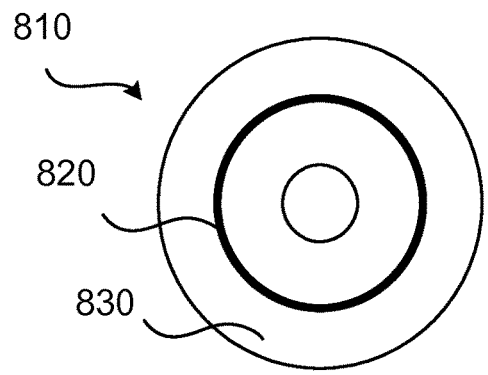
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

Figure 9:
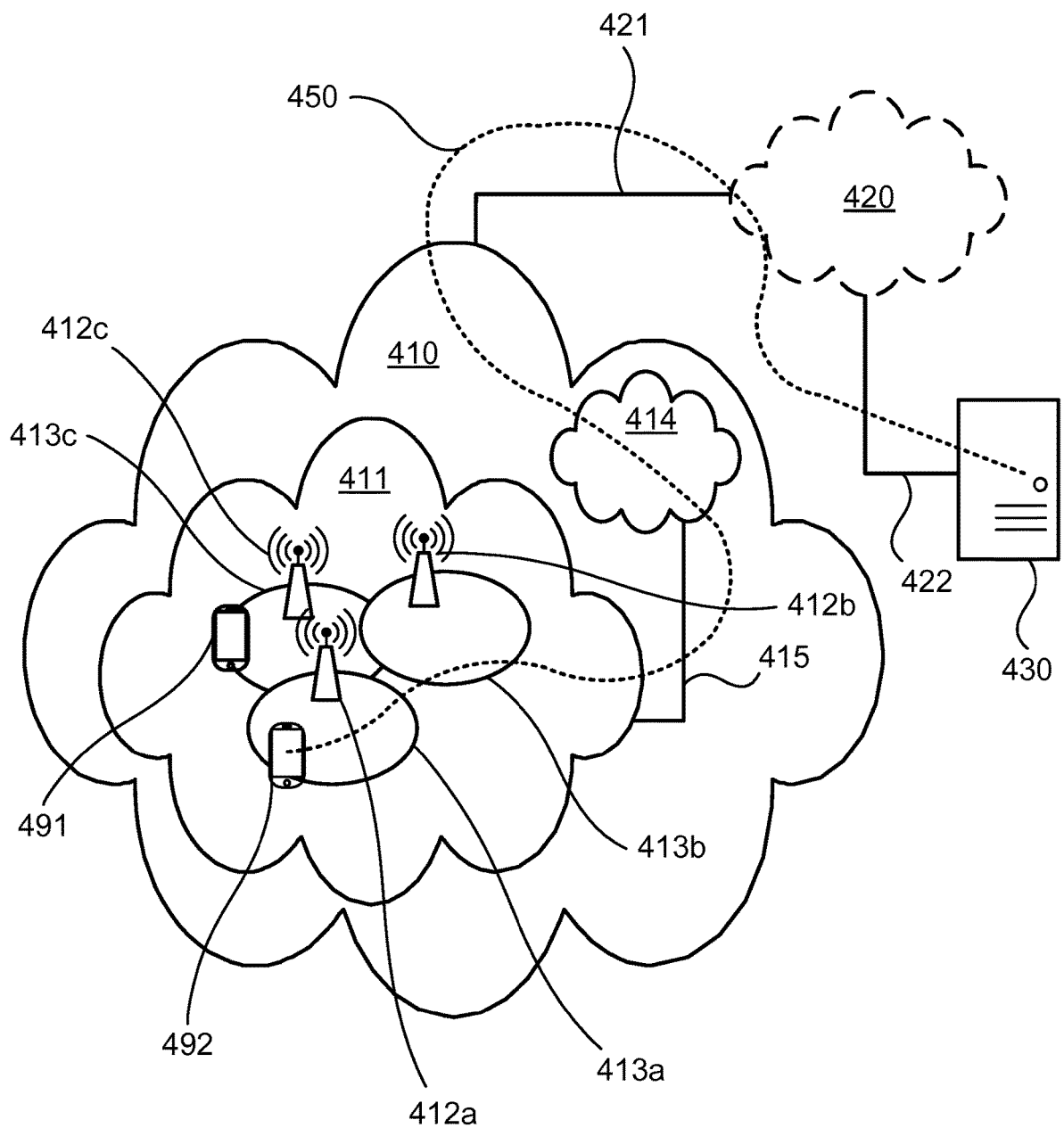
FIG. 9 is a schematic diagram illustrating a telecommunication network connected via an intermediate network to a host computer in accordance with some embodiments.

FIG. 9 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of radio access network nodes 412a, 412b, 412c, such as NBs, eNBs, gNBs (each corresponding to the network node 110 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the mobile wireless device 200 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 10:
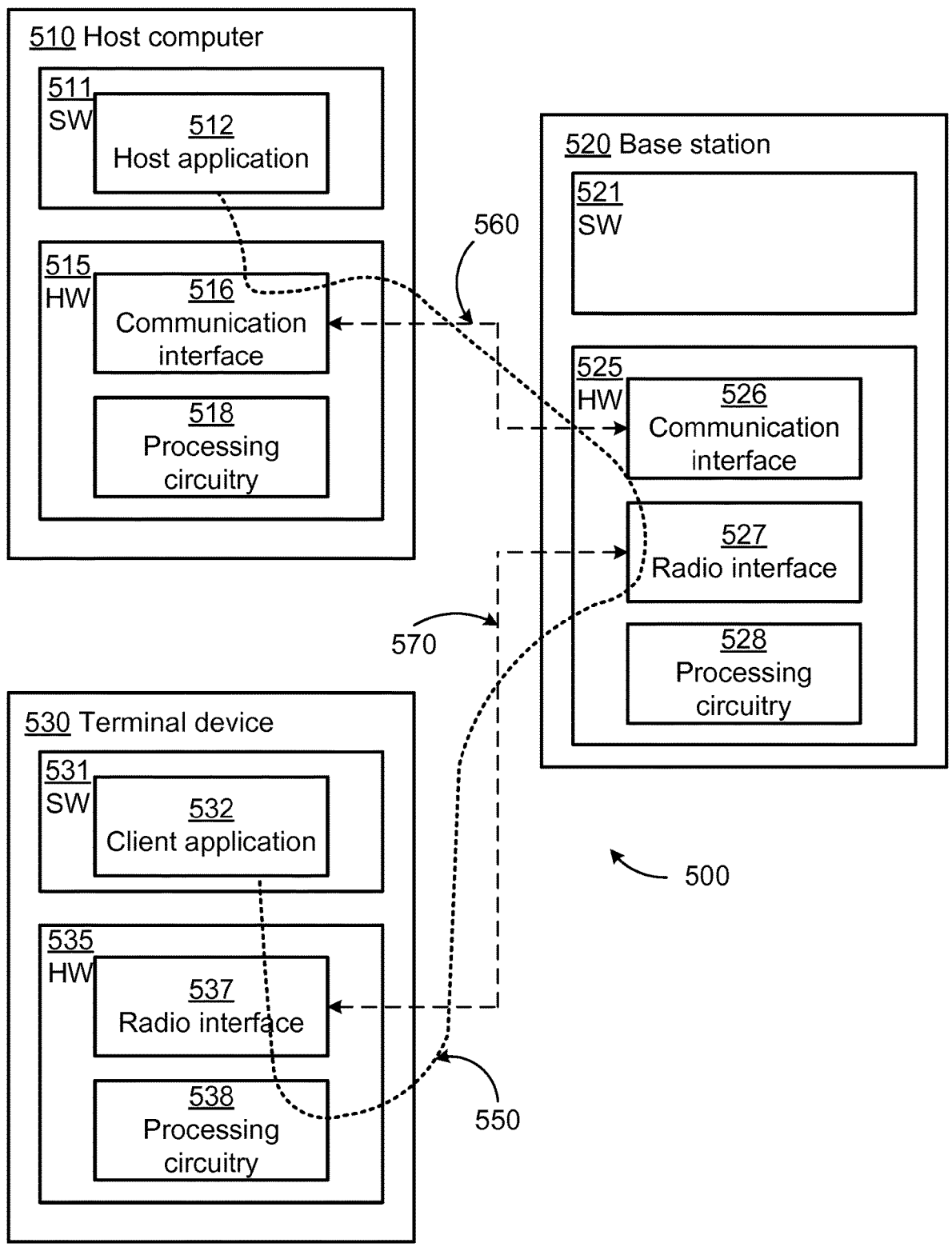
FIG. 10 is a schematic diagram illustrating host computer communicating via a radio base station with a terminal device over a partially wireless connection in accordance with some embodiments.

FIG. 10 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the mobile wireless device 200 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 110 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by radio access network node 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 10 may be similar or identical to host computer 430, one of network nodes 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for polarization aligned transmission towards a receiver device, the method being performed by a mobile wireless device, the mobile wireless device comprising an antenna array, the method comprising:

obtaining, based on analysis of an image of the receiver device as captured by an image capturing unit, information pertaining to an orientation of an antenna of the receiver device towards which a signal is to be transmitted; and transmitting the signal from the antenna array towards the receiver device using a wave, the wave having its polarization aligned, based on the orientation of the receiver device, with the antenna of the receiver device, the signal transmitted in a beamformed pencil beam by beamforming weights being applied to antenna elements of the antenna array, and the beamforming weights determined by orientation and direction of the antenna array relative to the orientation and direction of the antenna of the receiver device and relative distance between the mobile wireless device and the receiver device.

2. The method of claim 1, further comprising:
obtaining positioning information of the receiver device; and
positioning the mobile wireless device according to the positioning information such that the receiver device is in view of the image capturing unit for the image of the receiver device to be captured by the image capturing unit.

3. The method of claim 1, wherein the obtaining further comprises:
obtaining, based on analysis of the image of the receiver device, information of direction from the mobile wireless device towards the receiver device.

4. The method of claim 1, wherein the relative distance is estimated based on analysis of the image, focal view of the image capturing unit, and number of pixels of the image.

5. The method of claim 1, wherein the analysis of the image is performed by the mobile wireless device.

6. The method of claim 1, wherein the analysis of the image is performed by a computational entity separated from the mobile wireless device, and wherein the information of orientation of the receiver device is obtained by the mobile wireless device from the computational entity.

7. The method of claim 1, wherein the wave has its polarization aligned with the antenna of the receiver device by a relative magnitude of co-polarized and cross-polarized antenna element weights of the antenna array being adjusted to satisfy an angular relation.

8. The method of claim 1, wherein the wave has its polarization aligned with the antenna of the receiver device by antenna elements of the antenna array being aligned with respect to polarization with the antenna of the receiver device.

9. The method of claim 1, wherein the signal provides the receiver device with energy.

10. The method of claim 1, wherein the wave has a carrier frequency in the range 5 to 6 GHz.

11. The method of claim 1, wherein the receiver device is a wireless sensor device, such as a battery-less sensor device or a low-power sensor device.

12. The method of claim 1, wherein the mobile wireless device is an unmanned aerial vehicle.

13. The method of claim 1, wherein the antenna array comprises dual polarized antenna elements.

14. The method of claim 1, wherein the image capturing unit is integrated with, collocated with, or part of, the mobile wireless device.

15. The method of claim 1, wherein the image capturing unit is physically separated from the mobile wireless device.

16. A mobile wireless device for polarization aligned transmission towards a receiver device, the mobile wireless device comprising an antenna array, the mobile wireless device further comprising processing circuitry, the processing circuitry being configured to cause the mobile wireless device to:
obtain, based on analysis of an image of the receiver device as captured by an image capturing unit, information pertaining to an orientation of an antenna of the receiver device towards which a signal is to be transmitted; and
transmit the signal from the antenna array towards the receiver device using a wave, the wave having its polarization aligned, based on the orientation of the receiver device, with the antenna of the receiver device, the signal transmitted in a beamformed pencil beam by beamforming weights being applied to antenna elements of the antenna array, and the beamforming weights determined by orientation and direction of the antenna array relative to the orientation and direction of the antenna of the receiver device and relative distance between the mobile wireless device and the receiver device.

17. The mobile wireless device of claim 16, further being configured to:
obtain positioning information of the receiver device; and
position the mobile wireless device according to the positioning information such that the receiver device is in view of the image capturing unit for the image of the receiver device to be captured by the image capturing unit.

18. A non-transitory computer readable medium storing a computer program comprising computer code which, when run on processing circuitry of a mobile wireless device comprising an antenna array, causes the mobile wireless device to:
obtain, based on analysis of an image of a receiver device as captured by an image capturing unit, information pertaining to an orientation of an antenna of the receiver device towards which a signal is to be transmitted; and
transmit the signal from the antenna array towards the receiver device using a wave, the wave having its polarization aligned, based on the orientation of the receiver device, with the antenna of the receiver device, the signal transmitted in a beamformed pencil beam by beamforming weights being applied to antenna elements of the antenna array, and the beamforming weights determined by orientation and direction of the antenna array relative to the orientation and direction of the antenna of the receiver device and relative distance between the mobile wireless device and the receiver device.

* * * * *